D. P. DEMARNE.
MECHANICAL TRANSMISSION.
APPLICATION FILED MAY 14, 1917.

1,385,247.

Patented July 19, 1921.
6 SHEETS—SHEET 1.

Inventor.
D. P. Demarne

D. P. DEMARNE.
MECHANICAL TRANSMISSION.
APPLICATION FILED MAY 14, 1917.

1,385,247.

Patented July 19, 1921.
6 SHEETS—SHEET 2.

Inventor.
D. P. Demarne

D. P. DEMARNE.
MECHANICAL TRANSMISSION.
APPLICATION FILED MAY 14, 1917.

1,385,247.

Patented July 19, 1921.
6 SHEETS—SHEET 3.

Inventor:
Desire P. Demarne,
by Pennie, Goldsborough & Kurz
Attys

D. P. DEMARNE.
MECHANICAL TRANSMISSION.
APPLICATION FILED MAY 14, 1917.
1,385,247.
Patented July 19, 1921.
6 SHEETS—SHEET 4.
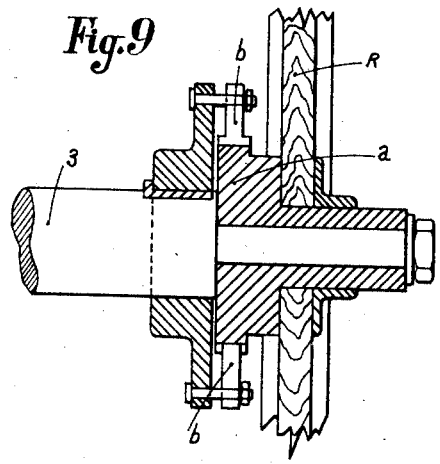
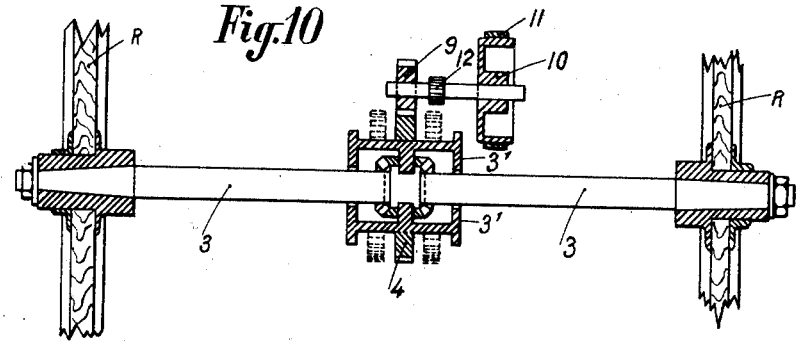
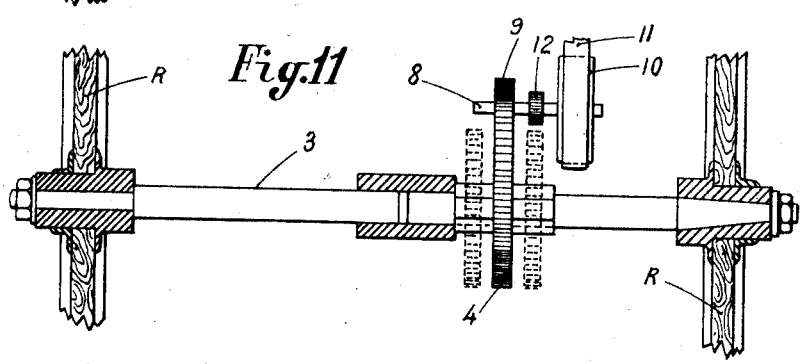
Inventor:
Desire P. Demarne.
By Pennie, Goldsborough & Shiell
Atty's.

D. P. DEMARNE.
MECHANICAL TRANSMISSION.
APPLICATION FILED MAY 14, 1917.
1,385,247.
Patented July 19, 1921.
6 SHEETS—SHEET 5.
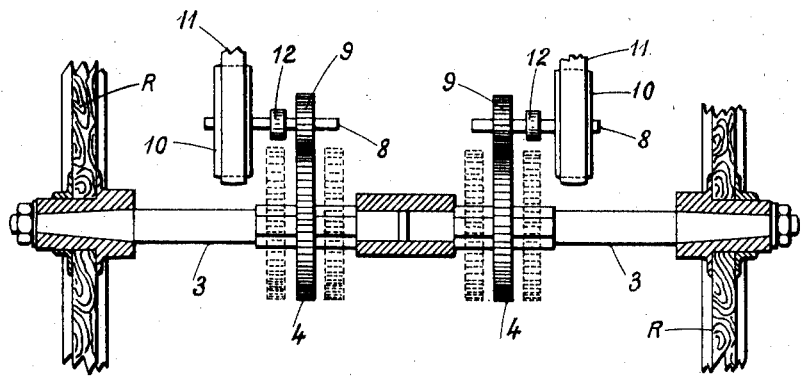
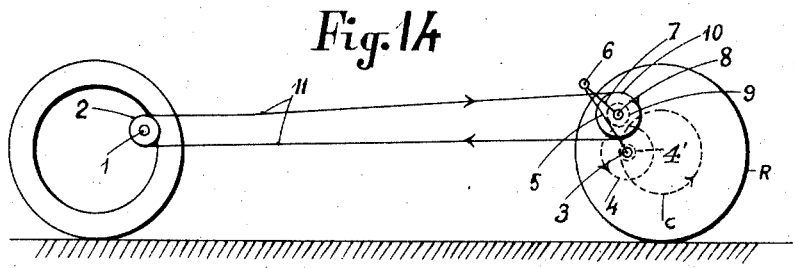
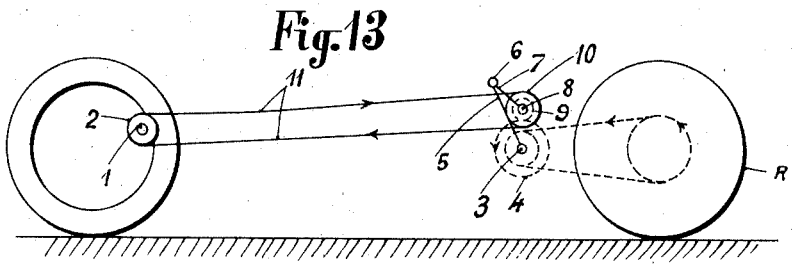

D. P. DEMARNE.
MECHANICAL TRANSMISSION.
APPLICATION FILED MAY 14, 1917.
1,385,247.
Patented July 19, 1921.
6 SHEETS—SHEET 6.
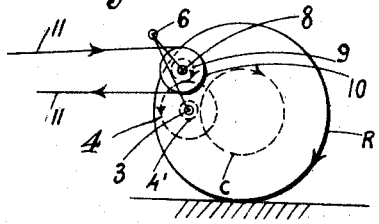
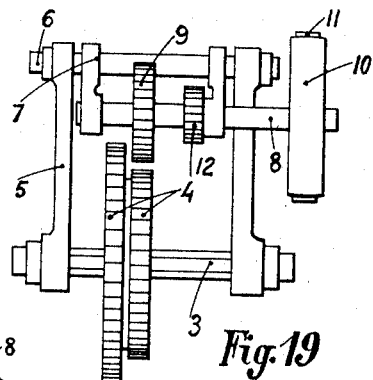
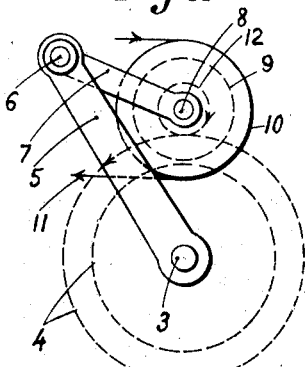
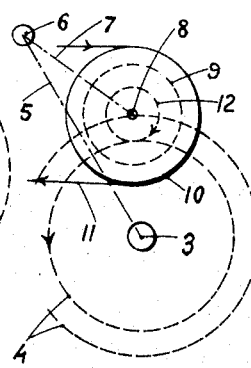
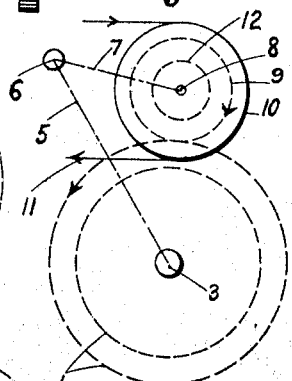
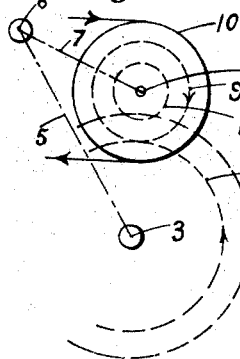
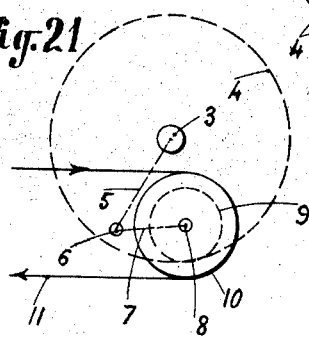

UNITED STATES PATENT OFFICE.

DÉSIRÉ PIERRE DEMARNE, OF ISSY-LES-MOULINEAUX, FRANCE.

MECHANICAL TRANSMISSION.

1,385,247.  Specification of Letters Patent.  Patented July 19, 1921.

Application filed May 14, 1917. Serial No. 168,535.

*To all whom it may concern:*

Be it known that I, DÉSIRÉ PIERRE DEMARNE, of 131 Route des Moulineaux, Issy-les-Moulineaux, Department of Seine, France, citizen of the French Republic, have invented certain new and useful Improvements in Mechanical Transmission; and I do hereby declare the following to be a full, clear, and exact description of the invention, such as will enable others skilled in the art to which it appertains to make and use the same.

The object of this invention is to effect by means of spur gearing having teeth of any type and being capable of being contained in a fluidtight gear case, the transformation of one speed given by or to a driving shaft into one or more different speeds, all by direct driving, by employing an automatically tightened and slackened belt chain or rope, the whole constituting a progressive coupling as well as a progressive or instantaneous uncoupling. The invention may be applied to belt, chain or rope drives, and particularly to a number of machine tools and lifting appliances, as well as to the transmission gear of motor cars. The mechanism and the working of this transmission gear are as follows:

Figure 1:
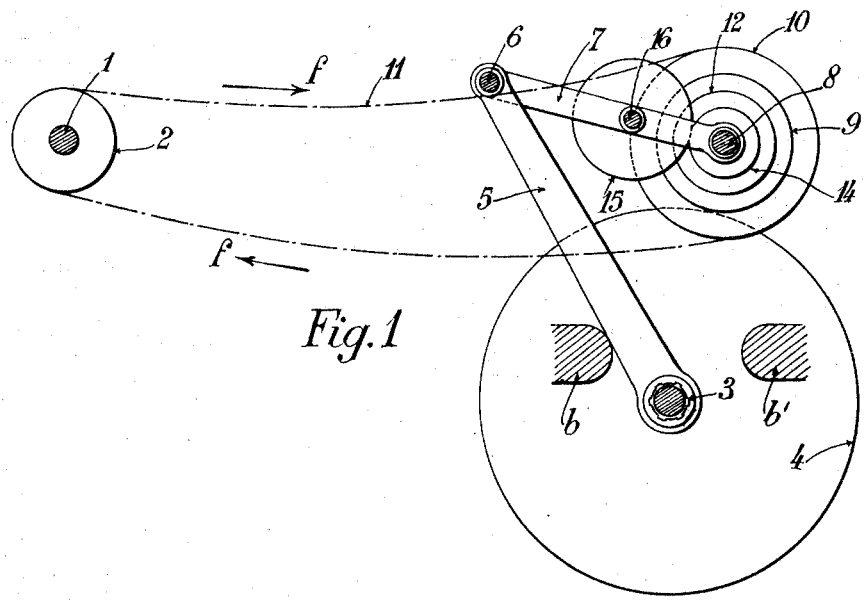
Figure 1 is a diagrammatic longitudinal view of this device at the moment when engagement is just beginning or when progressive disengagement is just becoming complete.

Figs. 5 to 21, inclusive, illustrate various applications of the device.

1 is the driving shaft, 2 shows a driving pulley keyed on to this shaft; 3 represents the driven shaft, upon which a toothed rim 4 is fixed; 5 is a connecting rod capable of oscillating about the shaft 3, the oscillations of the said connecting rod being limited by suitably chosen stops $b$ and $b^1$; its extremity opposite to the shaft 3 carries a shaft 6 that serves as a pivot for another connecting rod 7. At 8, at the other end of the connecting rod 7, a shaft is arranged upon which is keyed a toothed pinion 9 as well as a driven pulley 10 connected to the driving pulley 2 by a flexible member 11, belt, rope or chain.

The shafts 1, 3, 6 and 8 are parallel, the last two being displaceable parallel to the first two.

The spur wheels 4 and 9 (indicated merely by their pitch circles) being in gear in the same plane, and the axes 1 and 8 being assumed to be sufficiently close together for the belt 11 to be slack (the position illustrated in Fig. 1), by giving this belt a suitable direction of travel, that of the arrow $f$, the adhesion of the belt to the pulley 2 causes the pulley 10 to rotate. The pinion 9, which is driven by the pulley 2, rolls around the shaft 3 while remaining in gear with the toothed rim 4; thus it moves away from the driving shaft 1; the belt automatically tightens until the driving effort transmitted by the belt 11 becomes equal to the resistance applied to the shaft 3. At this moment the rim 4 is set in motion, and the tension of the belt becomes constant. This is the position shown in Fig. 3.

The triangle formed by the two connecting rods 5 and 7 and the line of centers of the shafts 3 and 8 remains indeformable, the driving effort keeping the pinion 9 constantly applied to the rim 4.

Figure 3:
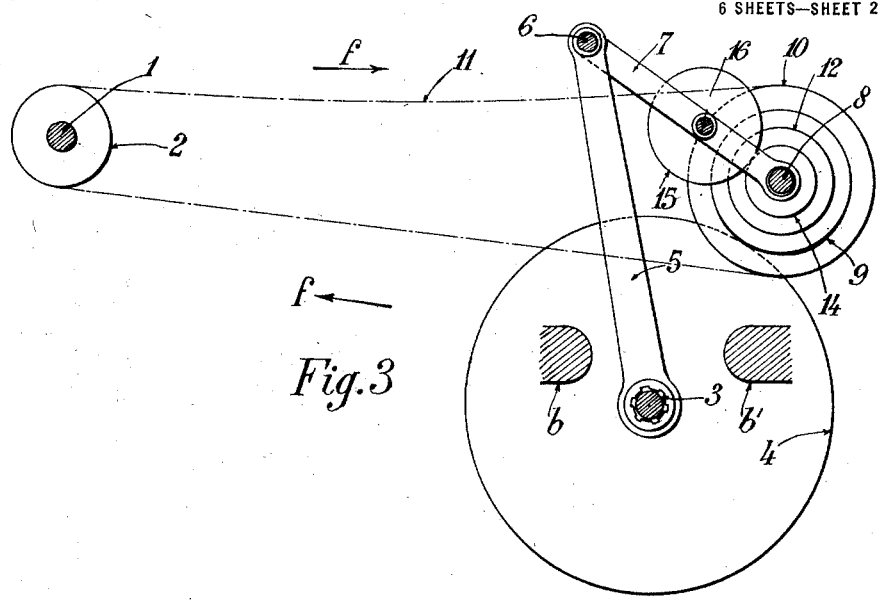
Fig. 3 shows the progressive engagement brought about by the preliminary rolling of the intermediate wheel 9 over the rim of the toothed wheel 4.

Bringing the mechanism back by a suitable control from the position of Fig. 3 to the position of Fig. 1 effects progressive disengagement by slackening the belt. Moving the axle 8 away from the shaft 3 by another control, either combined with the preceding or independent, takes the two toothed wheels 4 and 9 out of contact with one another, which gives instantaneous disengagement.

Figure 4:
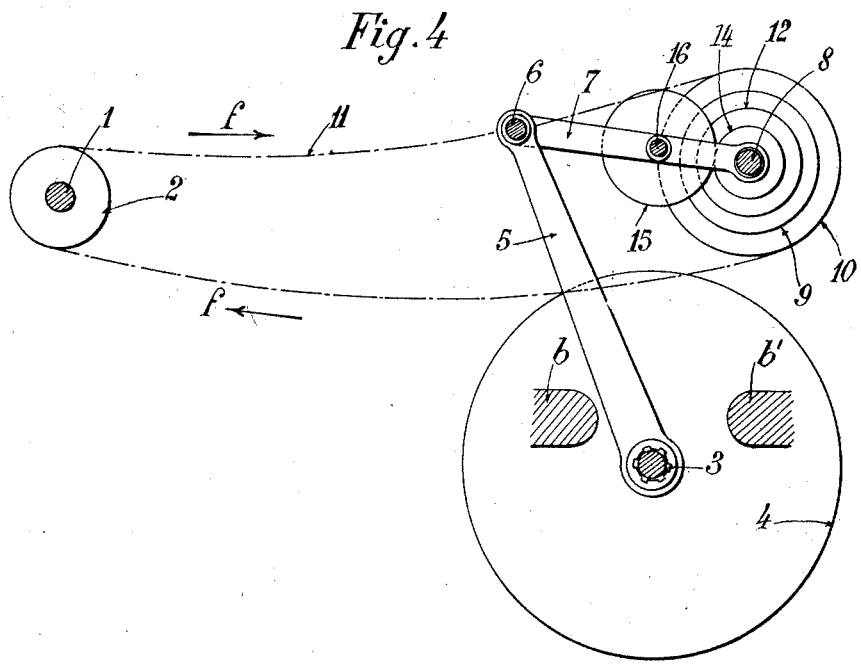
Fig. 4 shows the instantaneous disengagement brought about by moving the toothed wheel 9 away from the rim 4.
Figure 5:
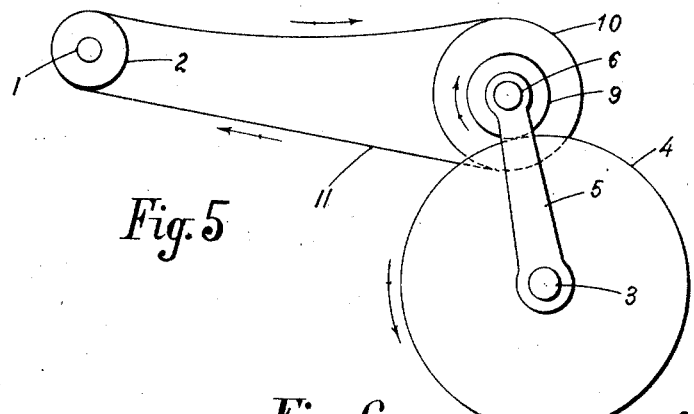

If instead of a single pinion 9 the shaft 8 carries a second pinion 12, or several others of various diameters but all having the same pitch as the rim 4, and if moreover the rim 4, being integral with the shaft 3 in its rotary motion, is capable of sliding along the shaft by means of grooves 13 or of any other suitable device, the change or changes of speed will be effected by bringing the toothed rim 4, while the epicycloidal train is in the position of Fig. 4, into the plane of one or other of these various pinions. After effecting this sliding operation of the rim 4 the train is brought back into the position of Fig. 1 in order to bring about the automatic tightening of the belt again, as well as the progressive engaging the working of which has been explained in connection with the pinion 9.

Figure 2:
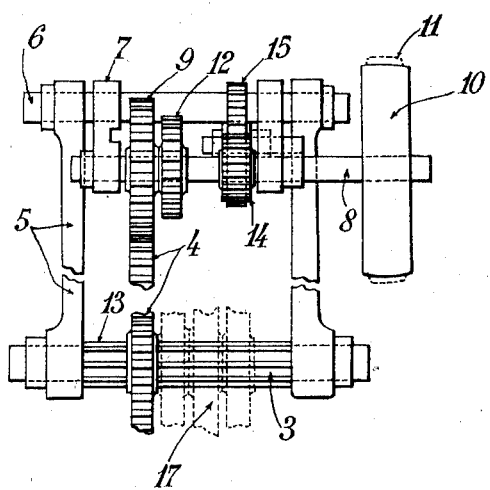
Fig. 2 shows a transverse view of the arrangement.

The transmission gear is set at the dead point when the toothed rim is not in the plane of any of the pinions of the epicycloidal train, in the position 17 of Fig. 2.

In the case of a single-speed transmission gear, with disengagement by the slackening of the belt only the epicycloidal train may be simplified. (See Fig. 5). The connecting rod 7 is then omitted; the toothed pinion and the driven pulley are fixed on to the shaft 6, the distance between the centers 3—6 being constant and suitably selected in order that the meshing may occur.

Figure 6:
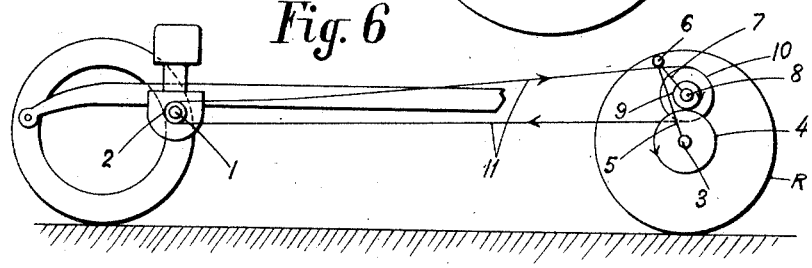
Figure 7:
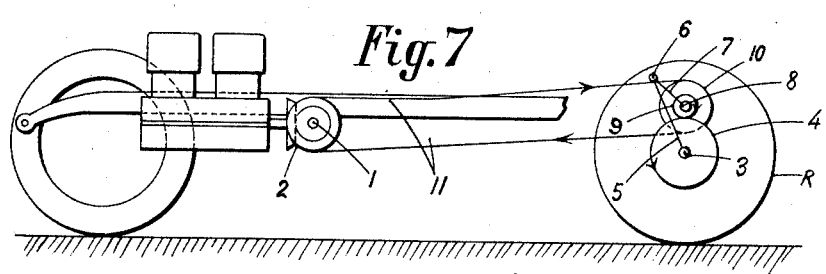

For motor cars the driving shaft 1 may be the crank shaft if the motor is placed transversely to the car frame Fig. 6; it may be a countershaft driven, for instance, by bevel gearing or by worm and wheel gearing if the motor is arranged longitudinally, Fig. 7.

Figure 8:
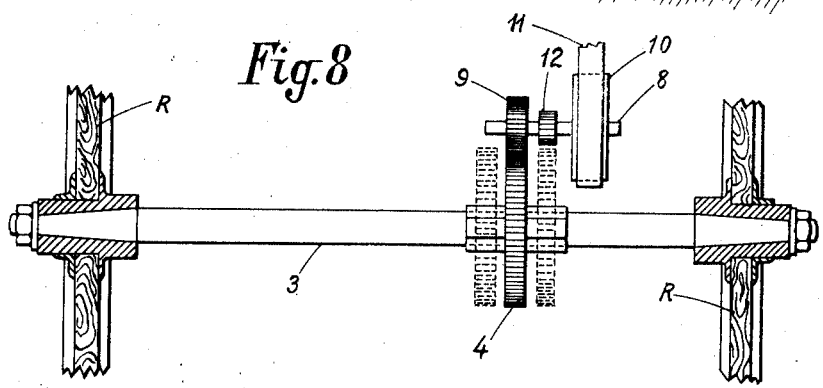

The toothed rim 4 may slide along the back axle and drive it if the two back wheels R are integral with the axle Fig. 8; or mounted as free wheels $a$ driven by the catches $b$ carried by the shaft 3, Fig. 9; it may be mounted sliding on the outside 3' of a differential, Fig. 10 if the two driving wheels are connected by such gearing; it may drive only a single wheel, Fig. 11, of a two-part shaft construction the part 3 of the shaft being mounted for free and independent rotation as in the case of vehicles of low power. A double transmission, acting separately on each driving wheel by two-half-sheet 3, Fig. 12, enables the differential to be omitted, each wheel only receiving the necessary effort for its own propulsion.

The toothed rim 4 may be integral with an intermediate shaft forming a countershaft and driving the transmission member of the wheels by a chain, Fig. 13, or a combination of pinions 4 and 4', Figs. 14 and 15, the pinion 4 gearing internally as in Fig. 14 or externally as in Fig. 15 with rim $c$ fixed on wheel R. This rim may also comprise several sets of teeth and form a multiple sliding spur wheel Figs. 16, 17, 18, 19 and 20, each combination of one of these gears with one of the pinions of the epicycloidal train giving a specified velocity.

The device for reversing the direction of working may be put into practice by adding two supplementary pinions, one of which, 14, being keyed onto the shaft 8, drives the second, which is indicated at 15 and which is capable of rotating on a shaft 16 carried by the connecting rod 7. This latter pinion 15 will be of such a diameter that the rim 4 can gear with it before being able to come into gear with the direct-drive pinion 14 upon the operation of the proper control. In this way the direction of working is reversed.

Instead of employing straight-toothed gear wheels any other type of gear wheels may be employed, internal or external teeth, herring-bone, gullet or helical teeth, etc. These gears, if suitably chosen, may moreover be inclosed in a fluidtight gear case, insuring easy lubrication and upkeep. Since the flexible transmission device that forms the subject-matter of this invention can advantageously be employed for a variety of drives it is obvious that the belts, chains or ropes utilized therein may take up any suitable inclinations to the horizon, and may work with any known fittings.

Finally, in the case of the application to motor cars, the change-speed gear being located between the driven pulley and the organ of transmission to the wheels, the belt, chain or rope works at a speed proportional to that of the driving shaft, whatever speed combination may be adopted, which insures for it prolonged usefulness and minimum wear.

I claim:

The combination with a driving shaft, of a main driven shaft and an intermediate driven shaft, a pulley on the driving shaft and a pulley on the intermediate shaft, a flexible transmission member extending between the same, a toothed wheel secured to the main driven shaft, a connecting rod loosely mounted on the main driven shaft, a second connecting rod pivoted to the end of the first mentioned connecting rod and carrying the intermediate driven shaft at its free end, a gear mounted on the intermediate driven shaft and adapted to mesh with the toothed wheel on the main driven shaft, and a reversing gear carried by the second connecting rod.

In testimony whereof I affix my signature, in presence of two witnesses.

DÉSIRÉ PIERRE DEMARNE. [L. S.]

Witnesses:
 A. FAUNNET,
 EMILE BERTRAND.